US012812580B2

(12) United States Patent
Costa-Requena

(10) Patent No.: US 12,812,580 B2
(45) Date of Patent: Nov. 24, 2026

(54) METHOD AND TSN BRIDGE FOR OPTIMIZING PERFORMANCE OF AN INDOOR INDUSTRIAL NETWORK AND AN INDUSTRIAL NETWORK

(71) Applicant: Cumucore Oy, Espoo (FI)

(72) Inventor: Jose Costa-Requena, Helsinki (FI)

(73) Assignee: Cumucore Oy, Espoo (FI)

(*) Notice: Subject to any disclaimer, the term of this patent is extended or adjusted under 35 U.S.C. 154(b) by 287 days.

(21) Appl. No.: 18/645,852

(22) Filed: Apr. 25, 2024

(65) Prior Publication Data

US 2024/0414675 A1 Dec. 12, 2024

(30) Foreign Application Priority Data

Jun. 6, 2023 (EP) .................................... 23177466

(51) Int. Cl.
*H04W 56/00* (2009.01)
*H04L 41/16* (2022.01)
(Continued)

(52) U.S. Cl.
CPC ........... *H04W 56/005* (2013.01); *H04L 41/16* (2013.01); *H04W 24/02* (2013.01); *H04W 40/205* (2013.01); *H04W 64/003* (2013.01)

(58) Field of Classification Search
CPC . H04W 56/005; H04W 24/02; H04W 40/205; H04W 64/003; H04W 56/0015; H04W 56/001; H04W 72/0446; H04W 4/70; H04W 28/0289; H04L 41/16; H04L 41/046; H04L 41/0806; H04L 41/0823;
(Continued)

(56) References Cited

U.S. PATENT DOCUMENTS 12,228,909 B2 * 2/2025 Wouhaybi .............. G06N 20/00
12,418,872 B2 * 9/2025 Zou ..................... H04W 56/001
(Continued)

FOREIGN PATENT DOCUMENTS

WO 2020064134 A1 4/2020

OTHER PUBLICATIONS

European Patent Office, European Search Report, Application No. EP23177466, Date of Completion Nov. 23, 2023, 10 Pages.
(Continued)

*Primary Examiner* — Brian T O Connor
(74) *Attorney, Agent, or Firm* — Ziegler IP Law Group, LLC.

(57) ABSTRACT

Disclosed is a computer-implemented method and a TSN bridge for optimizing performance of an indoor industrial network, an indoor industrial network therefor, and a method for predicting network problems in an indoor industrial network. The method optimizes the performance of an indoor industrial network by utilizing an AI module in a TSN bridge. The AI module receives SINR and Delay information from a sync agent in a mobile router, environmental parameters from sensors, and obstacle data from cameras. The AI module identifies potential time accuracy deterioration in device clocks based on the received data. This information is then communicated to a CNC and a CUC for adjustment of data packet size. Finally, a User Plane Function sync agent is instructed to send updated time information to the devices for clock adjustments.

10 Claims, 6 Drawing Sheets

(51) Int. Cl.
*H04W 24/02* (2009.01)
*H04W 40/20* (2009.01)
*H04W 64/00* (2009.01)

(58) Field of Classification Search
CPC . H04L 41/145; H04L 41/147; H04L 43/0852; H04L 41/149; H04L 12/4633; H04L 2012/40221; H04L 2012/40228; H04L 12/40169; H04J 3/0667; H04J 3/12; H04J 3/0635; G06N 7/01; G06N 20/00
See application file for complete search history.

(56) References Cited

U.S. PATENT DOCUMENTS

| | | | | |
|---|---|---|---|---|
| 12,532,278 | B2 * | 1/2026 | Galeev | H04W 56/001 |
| 2021/0302956 | A1 | 9/2021 | Sudhakaran et al. | |
| 2021/0325855 | A1 * | 10/2021 | Wouhaybi | G05B 19/4155 |
| 2022/0225253 | A1 * | 7/2022 | Galeev | H04W 56/001 |
| 2023/0292271 | A1 * | 9/2023 | Zou | H04W 56/001 |

OTHER PUBLICATIONS

Gourav Prateek Sharma et al, “Towards Deterministic Communications in 6G Networks: State of the Art, Open Challenges and the Way Forward”, arxiv.org, Cornell University Library, 201 Olin Library Cornell Univeristy Ithaca, NY 14853, Published Apr. 3, 2023, 22 Pages.

* cited by examiner

METHOD AND TSN BRIDGE FOR OPTIMIZING PERFORMANCE OF AN INDOOR INDUSTRIAL NETWORK AND AN INDUSTRIAL NETWORK

TECHNICAL FIELD

The present disclosure relates to industrial networks, more specifically to a computer-implemented method, a TSN bridge and a computer program for optimizing performance and predicting network problems of an indoor industrial network.

BACKGROUND

In today's fast-paced world, interconnected systems have become the backbone of most industries. These systems are heavily reliant on Time-Sensitive Networking (TSN), a technology that allows real-time communication over networks. Such technology is important in industries where data needs to be shared instantly and reliably. However, in such implementations, one significant challenge is the management of network traffic and improving its performance. When the network becomes too crowded with data, it can cause delays, which can be a serious issue when timely data transmission is crucial. Another challenge is to ensure that all devices on the network are in sync. TSN applications need accurate time synchronization to ensure smooth and coordinated communication.

However, several factors such as environment conditions, network disturbances, and shifts in device clocks can affect this synchronization. Traditional TSN networks are typically designed for static conditions and struggle with mobility scenarios, such as mobile robots in an industrial setting. That is, TSN technology struggles when the conditions of the network change or when devices on the network are mobile. For example, in an industrial setting with mobile robots, factors like noise, physical obstructions, or signal interference can lead to a decrease in communication quality and a loss in time accuracy. There are also issues with handling variable network conditions and device mobility. Factors such as signal interference, noise, and physical obstacles can lead to a decrease in the signal-to-interference-plus-noise ratio (SINR), ultimately leading to a deterioration in time accuracy. Current solutions often fall short in managing these factors effectively.

Therefore, in light of the foregoing discussion, there exists a need to overcome the aforementioned drawbacks.

SUMMARY

The aim of the present disclosure is to provide a computer-implemented method, a TSN bridge, an indoor industrial network, and a method for predicting network problems, to improve accuracy of time synchronization in the indoor industrial network (such as, private mobile networks) where global navigation satellite system (GNSS), like Global Positioning System (GPS) signal is not available and time information has to be distributed over wireless to mobile devices or routers. The aim of the present disclosure is achieved by a computer-implemented method and a TSN bridge for optimizing performance of an indoor industrial network, an indoor industrial network therefore, and a method for predicting network problems in an indoor industrial network as defined in the appended independent claims to which reference is made to. Advantageous features are set out in the appended dependent claims.

Embodiments of the present disclosure overcome aforementioned problems in the prior art, and enable efficiently to predict network problems in industrial networks and improve accuracy of time synchronization in the indoor industrial network.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the embodiments of the disclosure are shown in the drawings, with references to the following diagrams wherein.

DETAILED DESCRIPTION OF EMBODIMENTS

Figure 1:
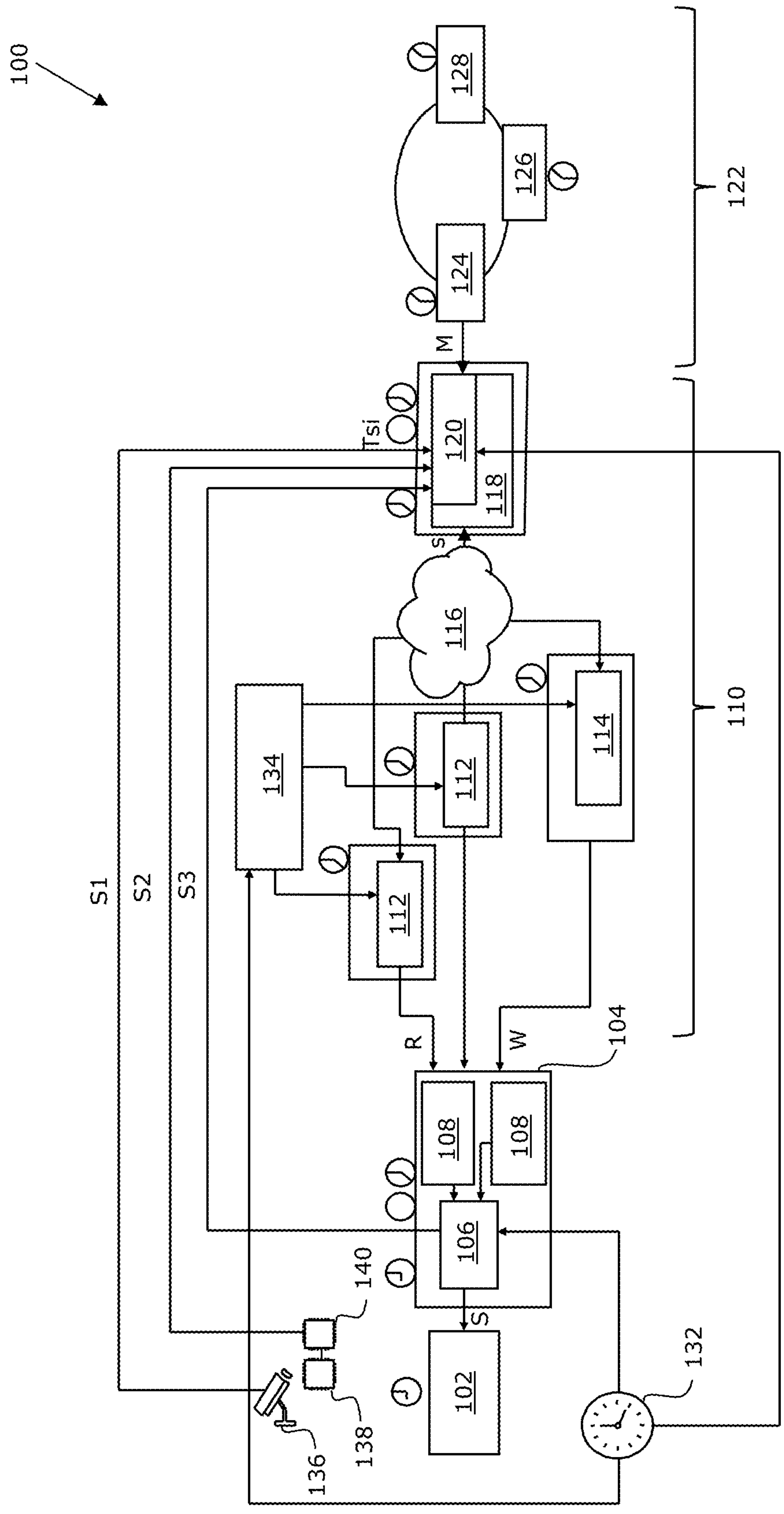
FIG. 1 is an illustration of schematic block diagram of an indoor industrial network, in accordance with an embodiment of the present disclosure.

The following detailed description illustrates embodiments of the present disclosure and ways in which they can be implemented.

In a first aspect, the present disclosure provides a computer-implemented method for optimizing performance of an indoor industrial network, the method comprises receiving in an AI module at a network side of a TSN bridge from a sync agent of a mobile router at a device side of the TSN bridge of the indoor industrial network a Signal to Interference and Noise Ratio (SINR) and a Delay information; receiving from one or more first sensors one or more first parameters of the indoor industrial network; receiving from one or more cameras an obstacle data; determining deteriorating time accuracy of clocks in the one or more mobile devices based on at least one of the received SINR, one or more first parameters and obstacle data; providing the determined information of the deteriorating time accuracy to a central network controller (CNC) and a central user configuration (CUC) of TSN controllers of the indoor industrial network; instructing the CNC and the CUC to adjust a size of a data packet to be sent between mobile and one or more fixed devices; instructing a User Plane Function (UPF) sync agent to send a time information to the one or more mobile devices to re-calculate the time information and adjust the clocks.

The present computer-implemented method addresses key challenges faced by indoor industrial networks concerning time synchronization accuracy and network performance optimization. Herein, the AI module optimizes the network performance, by receiving and processing various types of data, including Signal to Interference and Noise Ratio (SINR), delay information, environmental parameters, and obstacle data. SINR and delay information from the sync agent of the mobile router provides insight into the network's current state, while data from sensors and cameras provide details about environmental conditions and physical obstacles that may interfere with the network's functioning. The utilization of the AI module allows to analyse this data intelligently and in real-time to determine the accuracy of clocks in mobile devices, and to recognize patterns and make decisions that enhance the network's efficiency. The AI module communicates the determined time accuracy information to central units—CNC and CUC, which maintain the network's operation. In particular, the AI module, based on its observations, instructs the CNC and the CUC to adjust the data packet size sent between mobile and fixed devices, which helps in managing network traffic more efficiently, reducing the likelihood of network congestion.

This constant communication ensures the prompt addressing of any issues and fine-tunes network management. Together, these features provide a comprehensive, adaptive, and intelligent solution for optimizing performance of the indoor industrial network.

In a second aspect, the present disclosure provides a TSN bridge for optimizing performance of an indoor industrial network comprising at a device side a sync agent of a mobile router and comprising at a network side an AI module, wherein the AI module is configured to use machine learning algorithms to receive a Signal to Interference and Noise Ratio (SINR) and a Delay information from a sync agent of a mobile router at the device side of a TSN bridge; receive and process parameters of the indoor industrial network, an obstacle data from one or more cameras; determine deteriorating time accuracy of the clocks in one or more mobile devices of the indoor industrial network; communicate with a central network controller (CNC) and a central user configuration (CUC) of TSN controllers of the indoor industrial network.

The present Time-Sensitive Networking (TSN) bridge leverages AI and machine learning technology to address challenges in network operation. The AI module incorporated into the TSN bridge allows the system to leverage machine learning algorithms, enabling a higher degree of intelligence and adaptability in managing network operations. The TSN bridge involves gathering and processing a wide variety of data, including SINR, delay information, environmental parameters, and obstacle data from cameras, which enables the AI module to understand the network's state and operating conditions, which can directly inform decisions regarding network management and optimization. The TSN bridge also actively monitors and manages the synchronization of devices across the network, addressing a key challenge in indoor network operation where GPS access may be limited. The AI module further communicates with the CNC and the CUC, which ensures seamless transmission of important information, such as clock accuracy data, to these central units. By facilitating real-time communication, the TSN bridge helps maintain consistent coordination and rapid responses to potential issues.

In a third aspect, the present disclosure provides an indoor industrial network comprising a TSN bridge and an AI module integrated into the TSN bridge, wherein the AI module is configured to optimize the performance of the indoor industrial network by using machine learning algorithms to analyze data from a sync agent of the mobile router, sensors, and cameras, and to discover and report on extra processing delays in the network, UP and DL delays for asymmetric communications, SINR and obstacles that block signal and increase delay, predict potential problems in the network, take proactive measures to address them and interact with other network elements such as the UPF sync agent, CUC and CNC to optimize the performance of time-sensitive applications.

The indoor industrial network with the incorporation of the Time-Sensitive Networking (TSN) bridge and the AI module embedded into the TSN bridge, offers several distinctive benefits that stem from the synergistic interaction of these features. Combining the AI module with the TSN bridge creates a highly dynamic, intelligent component within the network. This combination permits the indoor industrial network to respond in real-time to changes in the network environment, adding a level of responsiveness that traditional networking hardware lacks. The AI module uses machine learning algorithms to analyse data from the sync agent, the sensors, and the cameras. This enables the indoor industrial network to identify potential issues like processing delays, uplink and downlink delays for asymmetric communications, signal interference, and obstacles that might increase signal delay. The AI module may further predict potential problems based on the data it analyses, which allows the network to address these issues proactively. The AI module interacts with key network elements such as the UPF sync agent, the CUC, and the CNC, which ensures optimal performance of time-sensitive applications as required for operations of the indoor industrial network.

In a fourth aspect, the present disclosure provides a computer-implemented method for predicting network problems in an indoor industrial network for optimizing performance of the indoor industrial network comprising collecting network data comprising at least one of a network performance data, a sensor data, and a device data; training an AI model on the collected network data; deploying the trained model in a TSN bridge; receiving real-time data from the network elements and sensors; using the trained model to predict network problems; adjusting the time information sent to the mobile devices to improve synchronization, and evaluating the performance of the model.

The proposed method for predicting potential network issues in the indoor industrial network initiates with the collection of network data, encompassing network performance data, sensor data, and device data. Using this, the AI model is trained to understand the dynamics of the network. Once the AI model is adequately trained, it is deployed into the Time-Sensitive Networking (TSN) bridge, providing it a real-time view of the network. Upon receiving real-time data from the network elements and sensors, the AI model utilizes its trained capabilities to predict potential network problems, even before they occur. In parallel, it continually adjusts the time information related to mobile devices, thus ensuring improved synchronization across the network. Finally, the performance of the AI model is evaluated, ensuring its effectiveness and determining need for further fine-tuning, if necessary. Thus, the present method provides a proactive, AI-enabled approach to anticipate and prevent network issues, thereby significantly enhancing the overall reliability and performance of the indoor industrial network.

In a fifth aspect, the present disclosure provides a computer program for optimizing performance of an indoor industrial network comprising instructions which when the computer program is executed by a computer, cause the computer to perform the aforementioned method.

The computer program provides a set of instructions which when executed on the computer trigger a series of actions aligned with the aforementioned computer-implemented method for optimizing performance of the indoor industrial network. As such, the computer program acts as an enabler for translating the prescribed method into actionable, digital operations within the network.

As used herein, the term "indoor industrial network" (hereinafter, sometimes, simply referred to as "network") refers to a digital communication infrastructure established within an indoor industrial environment to facilitate data exchange and automate various operations. These networks are designed to support robust, secure, and efficient connectivity for a multitude of devices and equipment involved in industrial processes. They serve as the backbone for integrating and coordinating different systems and technologies, ensuring the seamless functioning of an industrial setup. Examples of indoor industrial networks may be found in diverse industrial environments such as manufacturing plants, warehouses, data centres, hospitals, etc. The indoor industrial network, such as private mobile networks for industrial usage, comprises wireless devices such as mobile devices and fixed devices (base stations). The mobile devices are e.g., moving robots and moving industrial machines. These mobile devices connect to the network via either 5G radio or WiFi. They can either have an integrated 5G or WiFi modem within the device, or alternatively, they may establish connection through a 5G router. Herein, the mobile devices are also referred to as "End Stations" without any limitations. The fixed devices are wired devices such as non-moving machines, non-moving robots, computer in the control centre or computers running services.

Time synchronization is a critical requirement for many industrial applications. It ensures coordinated operation across multiple devices, which is necessary for automation, real-time data transfer, process control, and other time-sensitive operations. In private mobile networks, particularly those deployed indoors, maintaining accurate time synchronization can be a challenging task. The main method of time synchronization in many networks relies on Global Positioning System (GPS) signals. However, indoor environments often face a significant problem, like GPS signals are typically weak or non-existent inside buildings due to their inability to penetrate through dense materials like concrete, steel, etc. This lack of GPS signal leads to inaccuracies in time synchronization, affecting the performance and reliability of the network, and potentially causing a cascade of problems in the industrial processes that rely on it. Moreover, in private mobile networks utilized in industries, the network equipment, like mobile devices and routers, often move around within the network. The network needs to maintain time synchronization across these devices in real-time to support seamless operations. Distributing time information over wireless networks comes with its own set of challenges due to factors such as signal interference, network congestion, and latency, which can introduce additional delay or jitter, leading to inaccuracies in time synchronization.

The present computer-implemented method focuses on enhancing the capabilities of private mobile networks for industrial applications, with a particular emphasis on the implementation of Time-Sensitive Networks (TSNs). TSNs use both mobile and fixed devices to facilitate precise synchronization, allowing the TSN controllers to schedule communication slots accurately. The aim is to harmonize wired and wireless devices, allowing them to communicate in precise, allocated slots, which may boost network efficiency. The present method utilizes Artificial Intelligence (AI) to refine the accuracy of time synchronization. The AI module processes various parameters before relaying time information to the mobile devices. To enhance network reliability and predictability, the AI undergoes training based on optimal, routine, and high-risk scenarios. This allows the AI to anticipate network behaviour and potential issues. Additionally, reliability may be further improved by utilizing multiple radios, including various 5G base stations and Wi-Fi connections. This may involve connecting the same device from different angles and may even work in parallel to send duplicate timing packets.

The computer-implemented method for optimizing performance of the indoor industrial network begins with the AI module located on the network side of a Time-Sensitive Networking (TSN) bridge. In particular, the AI module of the network side of the TSN bridge of the indoor industrial network is connectable to the sync agent of the TSN bridge, to the sync agent of the mobile devices and to the CNC the CUC of the TSN controllers. The AI module is configured to discover during training period, extra processing delay in the indoor industrial network (including 5G network therein), and UpLink (UP) and DownLink (DL) delays for asymmetric communications. The AI module when integrated into the TSN bridge of the indoor industrial network allows the network to adapt to changing conditions and ensure low-latency, high-reliability communication for time-sensitive applications, which is required for the proper operation of industrial devices therein.

The AI module drives the optimization of network performance, including the feature of time synchronization by receiving and processing specific types of data from various sources within the network. Herein, the sync agent, which resides in the mobile router on the device side of the TSN bridge, helps in maintaining synchronization within the network by managing time-sensitive data transmission between the network side and the device side of the TSN bridge. The sync agent communicates with the AI module by sending two types of information, the Signal to Interference and Noise Ratio (SINR) and the Delay information. SINR is a measure that gives insights into the quality of a wireless signal. SINR considers not only the desired signal power but also the levels of interference (from other signals) and noise (random, unwanted variations) that may distort the signal. A high SINR value indicates a clear, high-quality signal, which is desired for accurate time synchronization. Delay information, on the other hand, represents the amount of time taken for a packet of data to travel from one point in the network to another. In the context of time synchronization, delay information may help determine if there's any lag in data transmission that could affect the accuracy of synchronization.

In addition to receiving the SINR and the delay information from the sync agent, the AI module also gathers information from first sensors which may be distributed across the indoor industrial network, and monitor and record various parameters or characteristics of the network environment. The exact nature of these first parameters may vary depending on the specific design and requirements of the network, and may include factors such as signal strength, data transmission speed, network traffic volume, and similar network-specific metrics that may impact the accuracy of time synchronization. In particular, the first parameters may include factors like the mobility of devices within the network, the distance between the transmitter and receiver, and any interference present in the network. Herein, specifically, interference may take several forms. For example, industrial environments may include various machines and equipment that emit electromagnetic interference. This interference may affect the SINR of devices within the network, such as mobile robots, by disrupting their wireless communication modules. Other sources of interference include external noise, such as electrical interference and background noise. Here, the AI module may measure and report electromagnetic interferences in the network, which helps in taking appropriate steps to handle the noise. Additionally, other signals present in same frequency band as a desired signal may also cause interference and decrease the SINR. Detecting such interfering signals may be achieved using a spectrum analyser or signal strength meters.

Information about these first parameters helps the AI module make more informed decisions about optimizing network performance. For instance, if the AI module identifies that a machine is causing such interference, it may take necessary actions which may involve adjusting the transmission power levels of the robots' wireless communication modules or changing the antenna's orientation to maintain a stable SINR level. The process of gathering these first parameters is a continuous, real-time operation. That is, the first sensors may constantly measure these parameters and then transmit the collected data to the AI module. This continuous inflow of data allows the AI module to maintain an up-to-date understanding of the network's condition and make timely adjustments to maintain or improve the accuracy of time synchronization.

Further, in addition to receiving data from the sync agent and the first sensors, the AI module also collects data from cameras installed within the indoor industrial network. These cameras are configured to capture visual data from the environment that may be analysed to identify potential obstacles that might interfere with the network's performance. These cameras may be strategically placed to get a comprehensive view of the indoor industrial network, and thus to enable capturing of any changes in the environment that may affect signal transmission. Herein, the obstacle data refers to information related to physical impediments that may affect the quality of the wireless signal in the network. These obstacles may include walls, buildings, trees, pillars, equipment, or even people moving around the environment. The nature of these obstacles may vary greatly, from stationary infrastructure elements to temporary, mobile obstructions. In the present configuration, the analysis by the AI module to identify obstacles may involve techniques such as computer vision and image processing, which may identify and classify different objects within the visual data. It may be understood that physical obstacles may significantly degrade wireless signals, leading to lower SINR values and increased delay times. These negative effects may, in turn, adversely affect the accuracy of time synchronization in the network. By identifying these obstacles, the AI module may anticipate and mitigate their impact on the network performance. For instance, the AI module may optimize the network's routing algorithms based on the identified obstacles, guiding signals along paths that avoid these obstacles and ensuring smoother communication, as discussed later in the description.

As discussed, time synchronization is crucial in the TSN environment and any degradation in time accuracy may significantly impact the network's overall performance which is particularly true for industrial networks, where processes and equipment often rely on precise timing for their operations. Once the AI module has received all the necessary data, including the SINR, the delay information, the first parameters from the first sensors, and the obstacle data from the cameras, the AI module starts analysing and processing this information to evaluate the time accuracy of the clocks in mobile devices. Herein, the AI module uses machine learning algorithms to perform this complex task. By considering all these factors, the AI module applies the machine learning algorithms to determine the degree of time accuracy deterioration in the clocks of the mobile devices. For example, the AI module might identify a correlation between high network load and increased timing discrepancies, or between certain types of obstacles and particular forms of signal degradation. Thus, the AI module, by using such diverse array of network and environmental data, may generate an accurate understanding of how various factors are affecting the time synchronization accuracy within the network, and may then use this understanding to determine measures that may help maintain precise time synchronization.

Once the AI module determines the deteriorating time accuracy of clocks in mobile devices, this information is communicated to components that control and manage the network, including the CNC and the CUC of the TSN controllers of the indoor industrial network. As may be contemplated, in the network, the CNC is responsible for controlling the operation of the network by adjusting the network's parameters and handles the configuration of devices to ensure efficient and reliable network performance. The CNC also orchestrates the timing and scheduling of data transmission over the network to meet the real-time requirements of the industrial applications it serves. On the other hand, the CUC is typically responsible for setting and maintaining user preferences and configurations, and may also manage the end devices within the network, adjusting their settings as needed to maintain optimal performance. By providing the determined information about the deteriorating time accuracy to the CNC and the CUC, the AI module ensures that these components of the network have the most accurate and current information about the network's timing performance. This information may, then, be used by the CNC and the CUC to adjust network parameters, reconfigure devices, or alter the data transmission schedule, as needed, to correct any identified timing inaccuracies.

In an example, if the AI module detects a pattern where the clocks of the mobile devices lose sync during periods of high network load, this information may be shared with the CNC. The CNC, in turn, may use this information to adjust the data transmission schedule during such periods, ensuring that the timing information may still be accurately delivered to all devices. Similarly, if the AI module identifies a certain type of obstacle causing signal degradation and resulting in timing inaccuracies, this information may be shared with the CUC. The CUC may then, perhaps, reconfigure the settings of the affected devices to mitigate the impact of these obstacles.

Further, the AI module instructs the CNC and the CUC to adjust the size of the data packets that are sent between the mobile devices and the fixed devices (i.e., to accommodate the difference in the clocks that will affect transmission time (Tx) and reception time (Rx) slots). As used in the context of the indoor industrial network, the mobile devices and the fixed devices refer to two categories of equipment used within the network environment. As discussed, the mobile devices may be portable electronic devices that may be easily carried or moved within the industrial environment such as smartphones, tablets, handheld scanners, and the like; and the fixed devices may be stationary equipment that is permanently installed or mounted in specific locations within the indoor industrial network such as base stations, Industrial Control Systems, network switches and routers, servers, and the like. Further, as used herein, packet size may greatly affect the performance of the network. If the packets are too large, they could exceed the network's maximum transmission unit (MTU), leading to fragmentation, which may result in increased overhead and latency, negatively impacting network performance. Conversely, if the packets are too small, this may lead to an excessive number of packets being transmitted, which can increase network overhead and potentially result in congestion.

Therefore, the AI module instructs the CNC and the CUC to adjust the packet size of data to accommodate the identified timing inaccuracies. For instance, if the AI module determines that the clocks in the mobile devices are running slow, causing them to receive data later than expected, the AI module may instruct the CNC and CUC to reduce the packet size of the data. By doing so, each data packet will take less time to transmit, helping to compensate for the slower clocks in the mobile devices. Alternatively, if the AI module determines that the clocks in the mobile devices are running fast, it may instruct the CNC and CUC to increase the packet size of the data. This may help to ensure that the faster clocks in the mobile devices do not result in them receiving data too quickly, which may potentially lead to congestion or data loss.

Furthermore, after identifying the deteriorating time accuracy of clocks in the mobile devices and communicating this information to the CNC and the CUC, the next step in the process is to instruct the UPF sync agent to send updated time information to the mobile devices. Herein, the UPF sync agent is primarily responsible for data traffic routing and management in the indoor industrial network. The UPF sync agent manages the dissemination of timing information across the network, ensuring accurate time synchronization. Specifically, the AI module instructs the UPF sync agent to send updated time information to the mobile devices. Upon receiving the new time information, the mobile devices re-calculate their time information and adjust their clocks. This is done to accommodate for any time discrepancies or drifts that might have occurred due to factors like signal interference, delays, or obstacles. For instance, if the AI module has determined that a particular mobile device's clock is consistently lagging due to signal interference from a physical obstacle, the UPF sync agent may forward a timing correction to that device. This will allow the mobile devices to re-calculate the time information and adjust the respective clocks, thus improving time synchronization within the indoor industrial network.

Thereby, the method involves a process of time synchronization within the industrial indoor network that communicates between a reference clock and an end device, which may be either a mobile device or a router connected via 5G or Wi-Fi. Time synchronization in the industrial indoor network may be achieved using a protocol such as Network Time Protocol (NTP). A Grand Master, which is typically a highly accurate reference clock, may send time information to the other devices in the network, including the AI/ML-enabled devices, such as the AI module, and end devices such as mobile phones and routers. These devices may then adjust their own clocks to match the time provided by the Grand Master. In a 5G or a Wi-Fi network, this synchronization may happen over the control plane or the management plane using the NTP or other time synchronization protocol.

This process includes the calculation of an offset and transmission delay, which are instrumental in maintaining accurate time synchronization. The offset is calculated between the master (reference) and the slave (end device) clocks. This calculation, denoted as $T2-T1$, measures the time difference between two instances. A similar calculation, $T4-T3$, is conducted to define the offset for the Slave-Master delay. The overall offset is subsequently calculated as the average of these two values, represented by $((T2-T1)-(T4-T3))/2$. Alongside the offset, the transmission delay is crucial in understanding the temporal relationship between the master and the slave. This value is computed by adding the two offset measurements $(T2-T1)$ and $(T4-T3)$, and dividing the sum by 2, yielding $(T2-T1)+(T4-T3)/2$.

The process also extends to TSN data transmission within the indoor industrial network between fixed and mobile devices. The packet size in this context is determined by the Transceiver (TRX) speed divided by the difference between $(T2-T1)$ and the end-to-end transmission delay (TX). The AI module is configured to monitor the clock of the mobile device, and detect any discrepancies or variations in the TX delay. If the AI module identifies that the clock of the mobile device is out of sync, or if it detects variation in the TX delay, it will update the TX delay within the network accordingly. Furthermore, the AI module may recognize if any of the mobile device link is unreliable. In response to this, the AI module is programmed to duplicate the data through different radios (like 5G or WiFi), providing a redundancy measure to ensure reliable data transmission.

In an embodiment, the method further comprises measuring one or more second parameters of an environment comprising temperature and humidity of the indoor industrial network by one or more second sensors. That is, additional sensors are used to measure other important environmental parameters, such as temperature and humidity, which provides a more holistic view of the conditions within the environment of the indoor industrial network. It may be appreciated that the temperature and the humidity may significantly impact the performance of the network devices, as well as wireless signal propagation. High temperature may lead to the overheating of devices, which in turn may cause equipment malfunction or failure. Moreover, changes in temperature may affect the clock accuracy of the devices, as crystal oscillators used in electronic devices for timekeeping may vary their frequency based on temperature changes. Similarly, high humidity may lead to condensation and potentially damage electronic components. Additionally, humidity may impact the attenuation of wireless signals, especially at higher frequencies, which may lead to a reduction in signal strength and a degradation of network performance. In another example, the temperature and humidity information are also used to adjust power levels of the devices in the network to improve their performance in different environmental conditions.

In the present configuration, the second sensors measure the temperature and humidity of the network environment and send this data to the AI module. The AI module may then integrate these second parameters with the SINR, delay information, and obstacle data to determine the timing accuracy of the clocks in the mobile devices with even greater precision. For instance, if the AI module identifies a high temperature and high humidity environment, it might anticipate a potential deterioration in clock accuracy or signal strength, and may accordingly instruct the CNC and CUC to adjust the packet size or transmission schedule pre-emptively, thereby mitigating potential disruptions in the indoor industrial network.

In an embodiment, the method comprises configuring the CNC to set the TSN frames transmission schedule and preferences and configuring the CUC to set the TSN frames transmission schedule in end devices. That is, the CNC, which oversees the overall network infrastructure, may be programmed to set up the schedule and preferences for transmitting TSN frames. This is done to ensure that time-sensitive data packets are prioritized and routed efficiently through the network to maintain synchronization and high network performance. In parallel, the CUC, which handles end-device configurations, may be directed to set the TSN frames transmission schedule in the end devices. By controlling the timing of data transmission from these devices, the present method may enhance synchronization and reduce potential latency. For instance, if the AI module detects a deteriorating time accuracy in mobile devices due to high interference or presence of physical obstacles; in such a scenario, the AI module may instruct the CNC and CUC to adjust the TSN frame transmission schedule. In such cases, the CNC and CUC, for example, change the transmission timings to less congested periods or prioritize certain types of data packets to ensure uninterrupted and synchronized data flow.

In an embodiment, in the present method, adjusting comprises reducing the size of data packet if the synchronization is not accurate or maximizing the size of data packet if the synchronization is accurate. As discussed, the adjustment of the packet size is directly linked to the accuracy of time synchronization within the network. In the indoor industrial network setting, the AI module in the TSN bridge, along with the CNC and the CUC, work in conjunction to facilitate this dynamic adjustment process. When the AI module detects a deterioration in the time accuracy of clocks in mobile devices, such as a signal that indicates the synchronization across the network is not accurate, it instructs the CNC and CUC to reduce the packet sizes of the data that are to be transmitted between mobile and fixed devices, as smaller data packets may be transmitted more quickly and are less likely to be delayed or lost due to network congestion or signal interference. Conversely, when the synchronization across the network is accurate with a high SINR, the AI module may increase the packet sizes of the data to make more efficient use of the network's bandwidth, as there is a lower ratio of header information (which doesn't carry application data) to payload data (which does). This approach may also reduce and packet collisions, and processing load on network devices as they need to handle fewer packets overall.

In an embodiment, the method comprises receiving a reference time from the one or more mobile devices having a GPS access for calculating a distance between the one or more mobile devices having the GPS access and the one or more fixed devices. That is, the AI module in the TSN bridge is configured to receive a reference time from any of the mobile devices in the network that have access to the GPS. This reference time is typically acquired from the GPS satellites and is globally synchronized, providing a high-accuracy timestamp that may serve as a universal reference for the network. This reference time is then used in calculating the distance between the mobile devices (with GPS access) and the fixed devices within the indoor industrial network. Since the speed of signal transmission is approximately known (nearly the speed of light), by comparing the reference time (when the signal was sent) with the local time (when the signal was received), the AI module may determine how far away the sending device is. This distance calculation may also be used to estimate a layout and/or a scale of the indoor industrial network, helping optimize data packet routing and minimize latency.

In an embodiment, the method comprises receiving in a de-jitter module a highest residence time from the AI module. As used herein, the "residence time" is the amount of time that a data packet spends within a system or a specific part of the system. In the present context, the residence time is the time taken for a data packet to pass through the TSN bridge. Thus, herein, the 'highest residence time' would be the longest time taken for this process. Further, as used herein, "network jitter" refers to variation in the delay of received packets. High jitter may lead to poor performance or even failure of time-sensitive tasks. By monitoring the highest residence time, the de-jitter module may understand the network's behaviour and implement techniques to reduce jitter. These techniques may include buffering data packets to even out the delay or re-routing data to avoid congested or slow parts of the network. Further, by monitoring the highest residence time, the de-jitter module may identify potential bottlenecks in the network and take proactive measures to address them. For instance, if the highest residence time is steadily increasing, it might indicate that a particular part of the network is becoming congested. The de-jitter module may then instruct, for example, via the AI module, the CNC to redistribute network traffic, alleviating the congestion and reducing the residence time in the network.

The present disclosure also relates to the TSN bridge as described above. Various embodiments and variants disclosed above, with respect to the aforementioned computer-implemented method for optimizing performance of the indoor industrial network, apply mutatis mutandis to the TSN bridge.

It may be understood that the TSN bridge helps in enhancing the performance of the indoor industrial network. The TSN bridge has a dual-sided architecture, with the device side that incorporates the sync agent of the mobile router and the network side that includes the AI module.

Herein, on the device side, the sync agent of the mobile router handles the time-sensitive data transmitted over the network, and is responsible for maintaining the precise timing required for synchronous data transmission across the network. This synchronous data communication is particularly important in the indoor industrial network, where devices often need to perform time-sensitive tasks in a coordinated manner. On the network side, the TSN bridge includes the AI module, specifically designed to utilize machine learning algorithms for performance optimization. The AI module processes different parameters related to the indoor industrial network to determine the deteriorating time accuracy of clocks in one or more mobile devices within the indoor industrial network. The AI module further communicates with the CNC and the CUC of the TSN controllers within the indoor industrial network to provide information regarding the time accuracy of clocks, potential network interference, and other relevant parameters. Based on this data, the CNC and CUC may make necessary adjustments to optimize the performance of time-sensitive applications, thereby improving the overall efficiency of the indoor industrial network.

The present disclosure also relates to the indoor industrial network as described above. Various embodiments and variants disclosed above, with respect to the aforementioned computer-implemented method for optimizing performance of the indoor industrial network, apply mutatis mutandis to the indoor industrial network.

The indoor industrial network uses the TSN bridge for maintaining the temporal accuracy required for synchronous data exchange within the network. To augment the capabilities of this network, the AI module is integrated directly into the TSN bridge. The AI module leverages machine learning algorithms, an advanced computing methodology that learns and improves from experience, to optimize the network's overall performance. Specifically, the AI module is configured to detect extra processing delays within the network, which may adversely impact the efficiency of the network's operations. The AI module may also identify UpLink (UP) and DownLink (DL) delays in asymmetric communications, which may otherwise contribute to the overall network latency. The AI module may further analyse the network data to forecast potential problems that might arise in the future. By doing so, the AI module enables the indoor industrial network to take pre-emptive action to address these issues before they become significant, helping to maintain the network's optimal performance. The AI module also interacts with other key network elements such as the UPF sync agent, the CUC, and the CNC, to effectively communicate the necessary adjustments needed to optimize the performance of time-sensitive applications in the present indoor industrial network.

The present disclosure also relates to a method for predicting network problems in the indoor industrial network as described above. Various embodiments and variants disclosed above, with respect to the aforementioned computer-implemented method for optimizing performance of the indoor industrial network, apply mutatis mutandis to the method for predicting network problems in the indoor industrial network.

The present method for predicting network problems in the indoor industrial network starts with collecting various types of network data including network performance data, sensor data, and device data. This gathered data is then utilized to train the AI model which, once appropriately trained, is deployed in the TSN bridge (as the AI module, as discussed above). The TSN bridge receives real-time data from network elements and sensors, and the AI model uses this information to predict potential network problems. Additionally, the AI model plays a role in adjusting the time information communicated to the mobile devices, thereby improving their synchronization with the network. The performance of the AI model is continuously evaluated to ensure optimum effectiveness.

In some examples, the AI module (which corresponds to the said AI model) also evaluates the accuracy of the clocks in the mobile devices. This assessment is required for maintaining accurate time synchronization across the indoor industrial network. The AI module also adjusts the packet size being transmitted between the mobile and fixed devices. For instance, the AI module might reduce packet size to avoid collisions if synchronization is inaccurate or increase it to optimize bandwidth usage if synchronization is accurate. Further, the AI module constantly monitors the clock synchronization in mobile devices and the transmission (TX) delay variations. If the AI module detects any discrepancies, it updates the TX delay in the mobile network, thereby improving time synchronization. Lastly, if a link to the mobile device is detected to be unreliable, the AI module duplicates data through different radios, such as 5G or Wi-Fi. This redundancy ensures reliable communication and accurate time synchronization, even if the link through one radio isn't stable.

According to the embodiments of the present disclosure, the indoor industrial network is equipped with two integral software modules to ensure smooth and synchronized communication across the network. The first software module is embedded within the mobile device, responsible for receiving time information from the network and applying logic to rectify potential inaccuracies caused by the wireless connection. This mobile module communicates with the second software module housed within the network. This network module has access to a reference time, which it communicates to the mobile device. This operation between the two modules ensures the mobile device may either synchronize its own clock or provide necessary time information to other connected devices, enabling them to synchronize their clocks. This feature is particularly beneficial if the first mobile device operates as a mobile router with other devices connected to it.

The mobile device module also manages the delay over the wireless connection with the network. This is achieved by configuring the mobile device to send a probe message to the base station. This message carries time information which assists in calculating the delay in both the uplink and the downlink. The delay may vary based on the device's distance from the base station; a higher delay often indicates a low SINR, suggesting the device is either far from the base station or operating in a poor radio channel.

To predict the relationship between the SINR levels and the delay, AI/ML algorithms are deployed. In calculating the delay, cameras as utilized to identify any obstacles in the path between the mobile device and the network that might contribute to an increased delay. AI/ML, specifically Bayesian networks, are utilized to estimate the impact of these obstacles, thus estimating the resultant additional delay.

Mobile devices with GPS access use GPS information as a reference time, assisting in the calculation of the delay over the wireless connection, based on the distance between the GPS-enabled mobile device and the base station. Furthermore, the software in these mobile devices is adapted to request joining a network slice to establish a superior radio link for sharing time information.

Alternatively, a secondary or a stand-by master clock may be used in case the primary one fails or breaks. The node, that may comprise GPS signal and may be used as reference to measure delay, etc., node can be used additionally as secondary Grand Master or StandBy clock for redundancy of time source.

The network module integrates an AI module, which calculates a correction time that is to be added to the time information transmitted to the mobile devices. The network module is configured to receive information from mobile devices to calculate the delay based on factors like SINR and identified obstacles. The network module then applies a correction factor to the reference time sent to the mobile devices.

Timestamps from the base station are also integrated into the network module to aid in delay calculations. The network module includes a TSN CNC/CUC or OPC UA interface (OPC Unified Architecture is a standardized interface or protocol used in industrial automation and control system, wherein OPC stands for OLE for Process Control, and OLE stands for Object Linking and Embedding, which is a technology developed by Microsoft for integrating and sharing data between different applications in the Windows operating system). This interface allows devices in the fixed network to adjust data transmission based on changes in the delay of the wireless connection, which means the network module is configured to alert the fixed TSN controllers or OPC UA about any variations in the transmission delay.

The network module further provides information about delay boundaries, i.e., max-min values in the wireless network, to other devices in the fixed network using the OPC UA or TSN CNC/CUC interface. These fixed devices then use this information to set their transmission schedules. To ensure these boundaries are consistent, the network module further implements delay mitigation solutions such as delay variation reduction through buffering. In this way, fixed devices can rely on the information received for setting their schedules.

Further, the AI model embedded within the network also calculates the residence time for each mobile device, considering factors such as distance to the base station, mobility, and the existence of obstacles. The AI algorithm estimates the residence time as a stochastic function, factoring in these variables. Furthermore, the de-jitter module takes the maximum residence time from the AI module to buffer the data from the devices, aligning all data for timed communications.

The entire system is packaged as an OPC UA module that presents the 5G system as a metadata structure, managed from a fixed OPC UA controller or a TSN switch that is overseen by TSN controllers.

The present disclosure may be implemented in an industrial factory setting that operates a private mobile network for industrial usage. Such network plays a crucial role in controlling and coordinating the movement of robots and other industrial machines across the factory floor. This network includes the TSN bridge that has the integrated AI module. The AI module is designed to receive various data from the network, including SINR information and delay information from the sync agent of the mobile router on the device side of the TSN bridge. The AI module also collects data on ambient temperature and humidity from sensors and obtains obstacle data from cameras. The AI module employs machine learning algorithms to process this diverse set of data, making real-time adjustments to the network. Thereby, the AI module optimizes performance and guarantee low-latency, high-reliability communication, which is required for time-sensitive applications.

For instance, suppose the AI module identifies an additional processing delay of 5 ms introduced by a particular router within the network. The AI module may promptly adjust routing algorithms to bypass that router. Similarly, if the AI module detects an obstacle obstructing the signal path between a mobile device and the base station, it may adjust the transmission power levels of the mobile device to compensate for the obstacle. Furthermore, the AI module adaptively adjusts transmission parameters to counter the effects of temperature and humidity on signal quality.

Apart from making real-time adjustments, the AI module also helps in performance monitoring. The AI module provides measured parameters and obstacle data to control centre of the industrial network. This comprehensive data view allows operators to keep an eye on network performance and troubleshoot problems as they arise. Moreover, the AI module regularly measures the clock accuracy of mobile devices in the industrial network and adjusts the time information dispatched to these devices, thereby enhancing synchronization. The AI module also factors in any interferences that may potentially compromise the accuracy of clocks in the mobile devices. This includes fluctuations in SINR, which may be influenced by a variety of factors such as the distance between the transmitter and receiver, interfering signals, obstacles, antenna orientation, noise, channel conditions, and mobility of the devices.

In a more specific scenario, wherein the factory employs a fleet of mobile robots for material transport, these robots come equipped with a wireless communication module enabling them to interact with the TSN network. The AI module in the TSN bridge receives the SNR information and delay from the sync agent of the mobile router, in addition to temperature, humidity, and obstacle data from the factory floor. The AI module processes this data using machine learning algorithms to identify potential network issues. For instance, the AI module may determine that the SINR of the wireless communication module of the robot drops when they approach a specific machine in the factory. With this information, adjustments may be made to maintain consistent network performance.

The AI module also monitors the clock accuracy of the wireless communication modules of the robots. The AI module achieves this by measuring the delay and comparing it with the anticipated delay. Based on this, the AI module fine-tunes the time information dispatched to the robots, improving synchronization, and ensuring the accuracy of the clock. For optimal accuracy in time synchronization, the present disclosure may leverage a precise time protocol (PTP) such as IEEE 1588 to sync the clocks in the mobile devices and network elements. PTP employs a master-slave architecture where a master clock disseminates time information to slave clocks, ensuring highly accurate time coordination. Alternatively, a GPS receiver may provide precise time references to aid synchronization.

In terms of delay prediction or determining potential reliability issues, the AI module analyses data from various sources such as the sync agent of the mobile router, sensors, and cameras. This data is processed to detect patterns and anomalies that might help to determine an emerging problem, such as a sudden surge in delay or a decrease in SINR. Using historical data, the AI module may even anticipate when and where issues may arise, allowing for proactive measures to be implemented.

The AI module may also be equipped to detect and report extra processing delays in the network, uplink and downlink delays for asymmetric communications, SNR fluctuations, and obstacles that obstruct signal and increase delay. In addition to this, the AI module may forecast potential issues in the network and adopt proactive measures to resolve them, all while interacting with other network elements like the UPF sync agent, CUC, and CNC to optimize the performance of time-sensitive applications.

DETAILED DESCRIPTION OF THE DRAWINGS

Referring to FIG. 1, illustrated is a schematic block diagram of an indoor industrial network 100, such as a private network, in accordance with an embodiment of the present disclosure. As illustrated, the indoor industrial network 100 includes an end station (end device) 102, a mobile router 104 comprising a sync agent 106 which acts as one or more first sensors, and one or more radio modems 108. The indoor industrial network 100 also includes a mobile network infrastructure 110. The mobile network infrastructure 110 includes multiple gNodeBs (gNBs) 112 (which is a component of the 5G (Fifth Generation) wireless network infrastructure), a Wi-Fi Access Point (AP) 114, a PTP compatible transport layer 116, and a UPF 118 with a sync agent 120. The UPF 118 is provided with a TSi (Time Source Indicator), which is a mechanism used in TSN networks to identify and convey the accuracy and reliability of a reference clock used for time synchronization. The indoor industrial network 100 further includes a fixed network infrastructure 122. The fixed network infrastructure 122 includes a TSN bridge 124, TSN-GM (Time-Sensitive Networking—Generalized Multicast) 126 and an end station (end device) 128, which together forms a TSN working domain (as represented by reference numeral 130). The indoor industrial network 100 also includes a reference clock 132 used for training and a Grand Master Clock 134. The indoor industrial network 100 further includes a camera 136, as well as a temperature sensor 138 and a humidity sensor 140 which acts as one or more second sensors. Further, as shown, each of the network components in both the mobile network infrastructure 110 and the fixed network infrastructure 122 includes a TSN module like a reference clock (as depicted). Further, as depicted, the sync agent 106 provides a synchronization signal 'S' to the end station 102. The gNBs 112 provides a radio signal 'R' (like 5G signal) and the Wi-Fi AP 114 provides a Wi-Fi signal 'W' to the mobile router 104. The PTP compatible transport layer 116 provides a signal 'S' to the UPF 118, and the TSN working domain 130 provides a modulation signal 'M' to the UPF 118. Further, as depicted, the camera 136 provides an image signal 'S1', the temperature sensor 138 provides a temperature signal 'S2', and the humidity sensor 140 provides a humidity signal 'S3'.

In the indoor industrial network 100, the end station 102 is a networked device, such as a computer or robot, that communicates with other networked devices or with the network itself and receives the synchronization signal 'S' from the sync agent 106, ensuring time synchronization across network devices. The mobile router 104, which comprises the sync agent 106, enables networked devices to communicate with one another. The mobile router 104 receives radio signals 'R' and Wi-Fi signals 'W' from the gNBs 112 and the Wi-Fi AP 114 respectively, enabling wireless connectivity. The sync agent 106 within the mobile router 104 ensures the time synchronization of the end station 102 by providing the synchronization signal 'S'. The radio modems 108 are devices that modulate and demodulate radio signals for communication. The gNBs 112 as components of the 5G infrastructure, handle radio signals 'R' that provide 5G connectivity to the mobile router 104. The wi-Fi AP 114 sends a wi-fi signal 'W' to the mobile router 104, enabling wi-fi connectivity. The PTP compatible transport layer 116 provides a signal 's' to the User Plane Function (UPF) 118, ensuring precise time synchronization across the network. Further, the UPF 118, equipped with the sync agent 120 (and the Tsi), manages packet routing and forwarding. The TSN bridge 124 acts as a bridge between the fixed network infrastructure 122 and other devices, facilitating data transfer. The TSN-GM 126 provides protocol which ensures efficient multicast data distribution in time-sensitive networks. The end station 128 is similar to the end station 102 and communicates with the network or other networked devices within the TSN working domain 130. The reference clock 132 is used for training, ensuring precise timing across the network, and the Grand Master Clock 134 provides the primary time source for the network, ensuring precise time synchronization. The camera 136, the temperature sensor 138, and the humidity sensor 140 monitor the environment and provide respective image, temperature, and humidity signals ('S1', 'S2', and 'S3') for further processing. All these components, working together, maintain reliable, high-speed, time-synchronized communication within the indoor industrial network 100.

Figure 2:
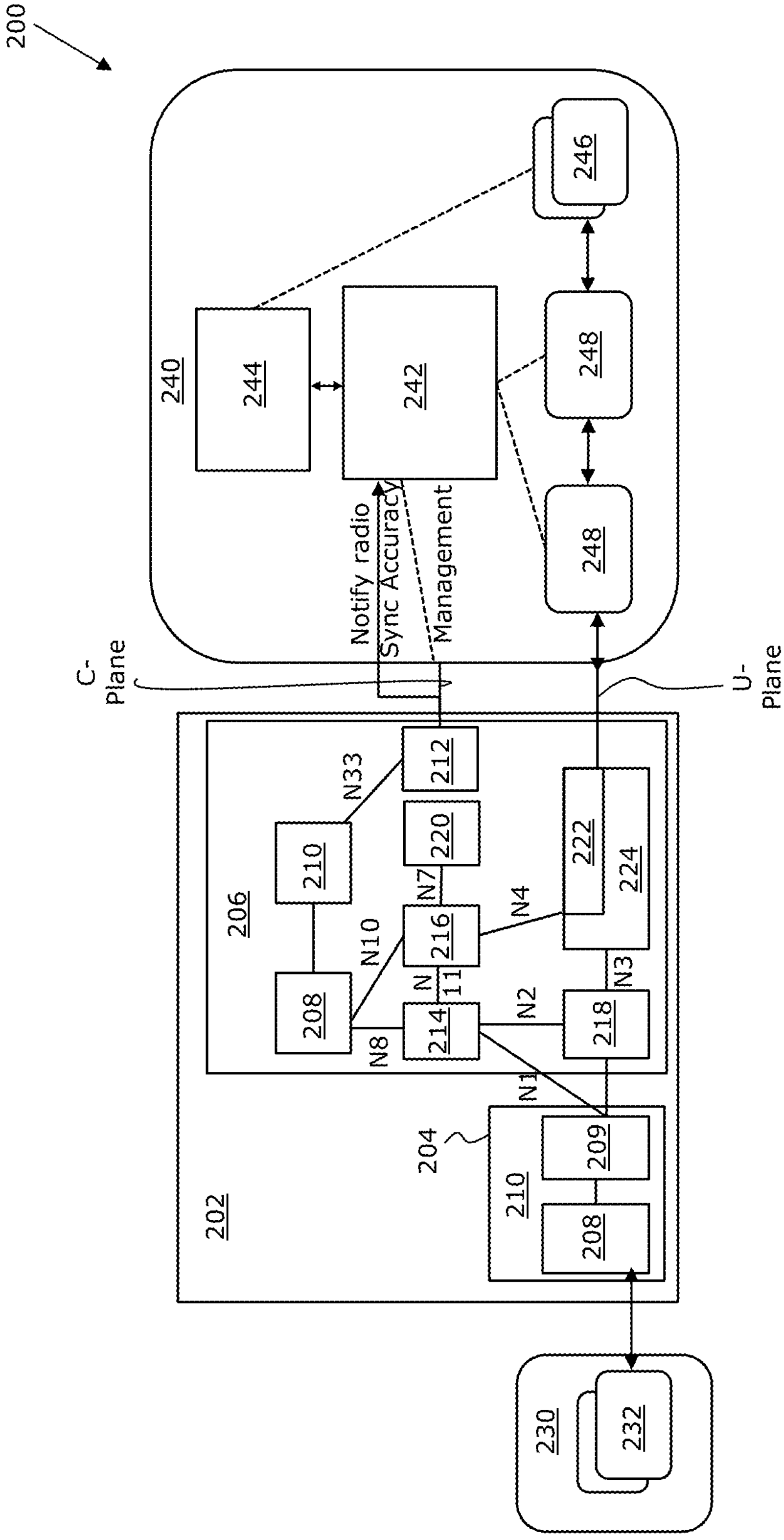
FIG. 2 is an illustration of schematic block diagram of a TSN system, in accordance with an embodiment of the present disclosure; Figures

Referring to FIG. 2, illustrated is a schematic block diagram of a TSN system 200, in accordance with an embodiment of the present disclosure. As illustrated, the TSN system 200 includes a TSN bridge 202 having a device side 204 and a network side 206. The device side 204 of the TSN bridge 202 includes a sync agent 208 and a modem 209 of a mobile router 210 which receive and process data for transmission across the TSN system 200. The network side 206 of the TSN bridge 202, which is 5G core, includes a Unified Data Management (UDM) module 208 which stores and manages user data, and is linked to a Network Exposure Function (NEF) 210 and an AI module 212 via an N33 interface. The UDM module 208 is also connected to an Access and Mobility Function (AMF) 214 via an N8 interface and to the Session Management Function (SMF) 216 via an N10 interface. The AMF is 214 responsible for access and mobility management of the devices, and is further connected to the SMF 216 via an N11 interface, and a Next Generation-Radio Access Network (NG-RAN) 218 via an N2 interface, and the modem 210 of the device side 204 of the TSN bridge 202 via an N1 interface. The SMF 216 manages the sessions in the network, and is connected to a Policy Control Function (PCF) 220 via an N7 interface and a sync agent 222 of a User Plane Function (UPF) 224 via an N4 interface. The UPF 224 includes the sync agent 222 and is responsible for packet routing and forwarding. The PCF 220 establishes policies that control how the network operates. The NEF 210 exposes the services and capabilities of the network to the AI module 212 via the N33 interface. The NG-RAN 218 provides connectivity between devices and the core network, and is further connected to the UPF 224 via an N3 interface. Herein, N1, N2, N3, N7, N8, N10, N11, N33 are interfaces that facilitate the connection and communication between different network elements. The TSN system 200 further includes a U-Plane, which is a user plane responsible for transporting user data; and a C-Plane, which is a control plane responsible for controlling the network's operations.

The TSN system 200 also includes a TSN unit 230 with talkers 232. The TSN system 200 further includes Time-Sensitive Networking (TSN) controllers 240, which include a Central Network Controller (CNC) 242 and a Central User Configuration (CUC) 244. The TSN controllers 240 helps in managing network traffic and configurations to meet the strict timing requirements of industrial applications. The TSN controllers 240 further includes listeners 246 and bridges 248 which connects to a fixed network infrastructure to facilitate seamless communication across the network. The AI module 212 receives data from the NEF 210 via the N33 interface. The AI module 212, which incorporates a de-jitter module, applies AI and machine learning algorithms to optimize the network's performance. This intricate network design ensures reliable, low-latency, high-throughput communication required for industrial applications. By continuously monitoring and adjusting network parameters based on real-time conditions, the AI module 212 provides robust and efficient communication to support the operations of time-sensitive applications in an industrial setting.

Figure 3A:
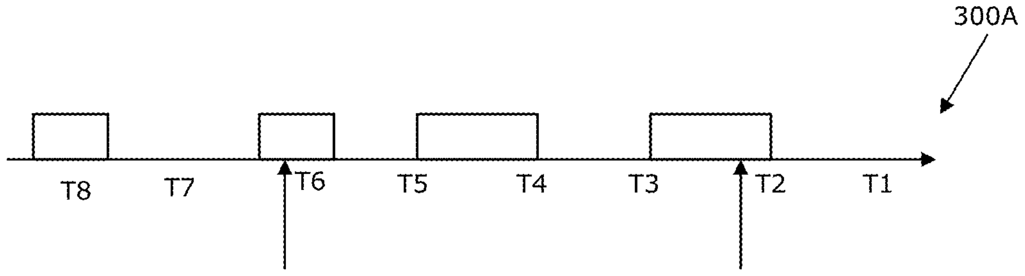
FIG. 3A and FIG. 3B are illustrations of exemplary time signals, in accordance with an embodiment of the present disclosure.
Figure 3B:
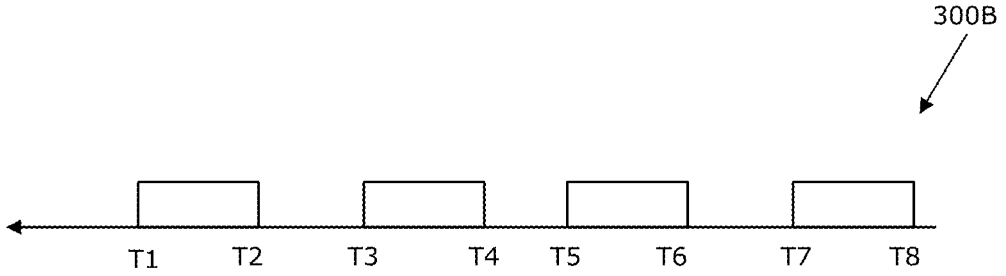

Referring to figures FIG. 3A and FIG. 3B, illustrated are exemplary depictions of time signals 300A and 300B, respectively, in accordance with an embodiment of the present disclosure. As depicted in the time signal 300A, a bad sync at T6 may cause the Central Network Controller (CNC) to tell the corresponding device to reduce packet size to avoid collisions. Further, as depicted, an accurate sync at T2 may cause the CNC to tell the corresponding device to use maximum packet size. Similarly, as depicted in the time signal 300B, the accurate syncs at all time intervals may cause the CNC to tell the corresponding device to use regular packet size.

Figure 4:
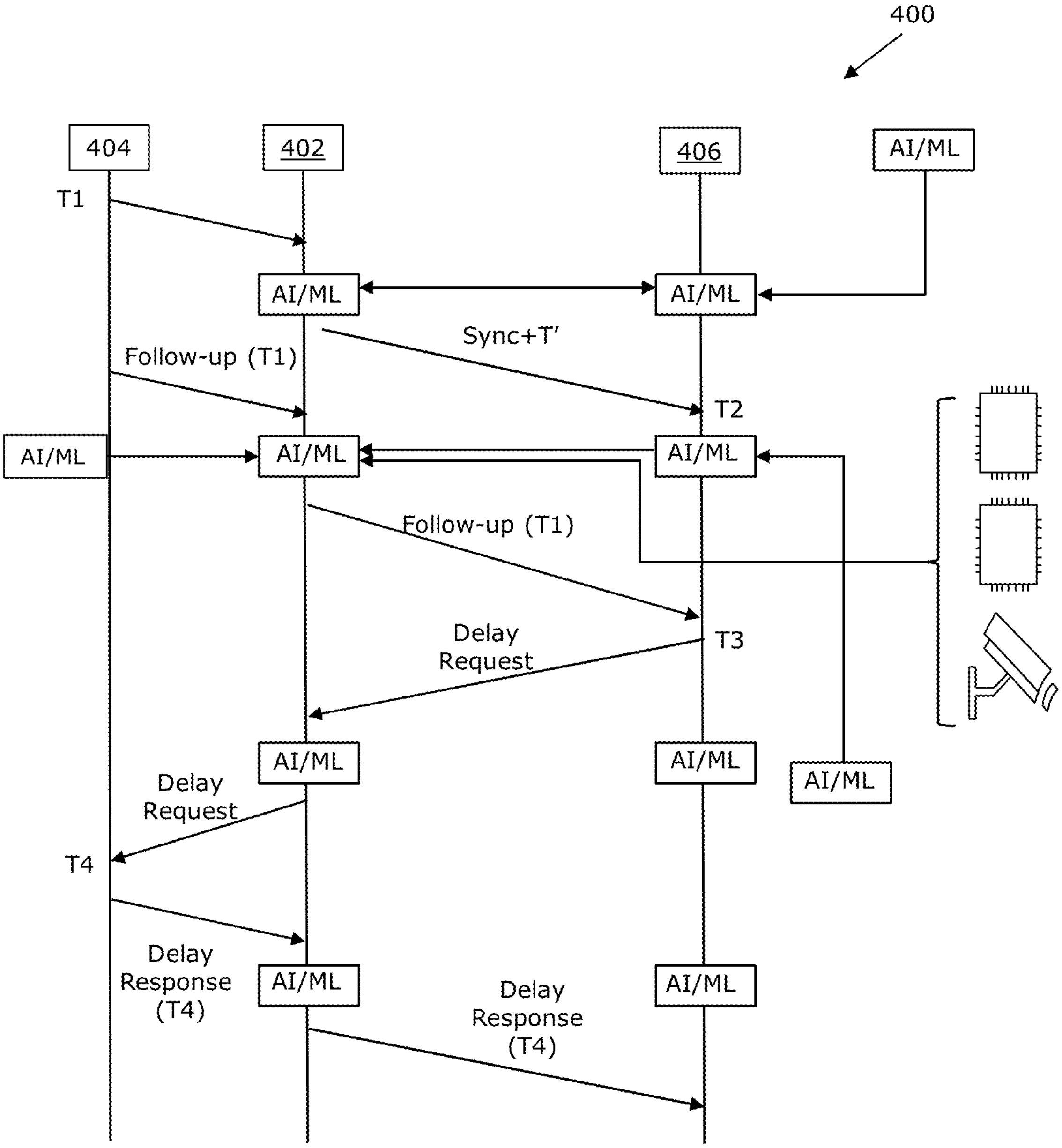
FIG. 4 is an illustration of schematic of a time synchronization scheme, in accordance with an embodiment of the present disclosure.

Referring to FIG. 4, illustrated is a time synchronization scheme 400 that leverages artificial intelligence and machine learning (AI/ML), within the context of a network that includes intermediate mobile networks, in accordance with an embodiment of the present disclosure. The time synchronization scheme 400, applied in a time-sensitive network (TSN) 402, ensures improved synchronization accuracy and overall network performance. In the time synchronization scheme 400, there are two primary nodes, a grand master node 404, and a slave node 406. The grand master node 404 is the authoritative time source for the network, while the slave node 406 aligns its clock to the grand master node 404. Communication and synchronization between the nodes 404, 406 consider transmission delays, represented by the formula (T2−T1)+(T4−T3)/2. During a training period, the AI/ML discovers additional processing delays inherent in the 5G network and recognizes asymmetries in the uplink (UP) and downlink (DL) communication delays. The AI/ML report the Signal-to-Interference-plus-Noise Ratio (SINR) in the device, a factor that may increase transmission delays. The TSN 402 uses an automatic weight calculation (AWC) that connects with sensors such as cameras to detect new obstacles that could block the signal, thereby affecting network performance and time synchronization.

The time synchronization scheme 400 also introduces a residence time formula, Ti=a·Di+b·Mi+c·Bi. In this formula, "Di" represents the distance of node i, with a corresponding weight factor 'a' calculated through an AI algorithm. "Mi" stands for the mobility of node i, with an associated weight factor 'b'. "Bi" signifies signal blocking, with an associated weight factor 'c'. The time synchronization scheme 400 deploys a probe for training the AI supervised learning algorithm. The probe, equipped with a Global Positioning System (GPS) for reference time, alters the Di value by moving, allowing for the calculation of the 'a' parameter. It maintains a fixed speed Mi to compute the 'b' parameter and positions itself behind an obstacle to measure Bi, thereby calculating the 'c' parameter.

Figure 5:
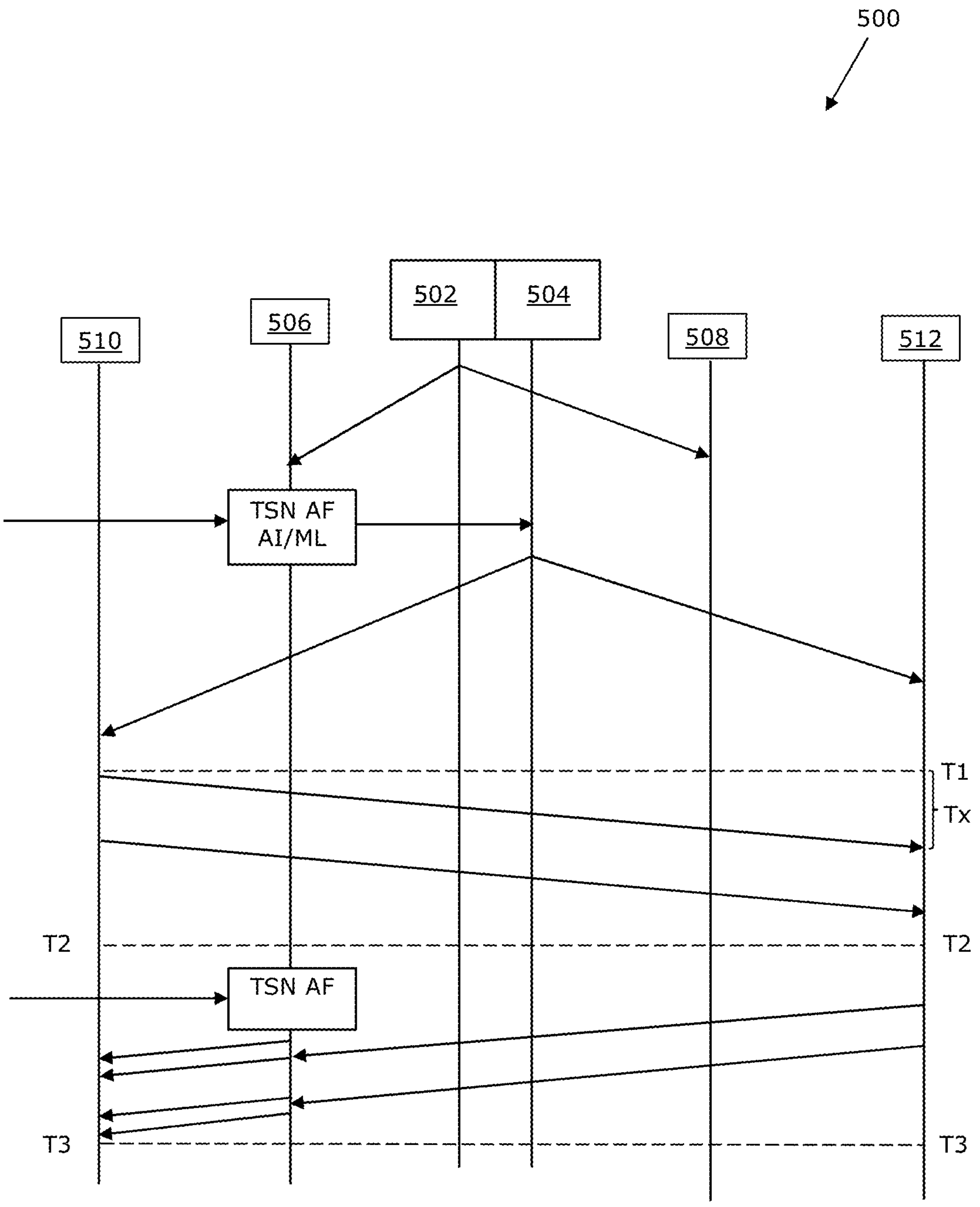
FIG. 5 is an illustration of schematic of a transport management scheme, in accordance with an embodiment of the present disclosure.

Referring to FIG. 5, illustrated is a transport management scheme 500 in Time-Sensitive Networking (TSN), with a focus on TSN controllers, including a CNC 502 and a CUC 504, and their interaction with various network components, in accordance with an embodiment of the present disclosure. In the transport management scheme 500, a mobile network 506 is utilized, and a TSN switch 508, in the form of bridge, or router is provided within the mobile network 506. A mobile device 510 operates as a 'Talker,' transmitting data, while a fixed device 512 functions as a 'Listener,' receiving the data. The mobile device 510 sends a signal (T3) to the TSN switch 508 within the mobile network 506. This signal then proceeds to the fixed network infrastructure via the TSN switch 508, ultimately reaching the fixed device 512. TSN controllers, specifically the CNC 502 and the CUC 504, oversee this communication process. The CNC 502 orchestrates the mobile network 506, coordinating data traffic, while the CUC 504 is responsible for user configuration settings. In the mobile device 510, a Transmission (TX) Slot is designated for the outgoing data packet. Similarly, in the fixed device 512, a Reception (RX) Slot is allocated for incoming data.

Figure 6:
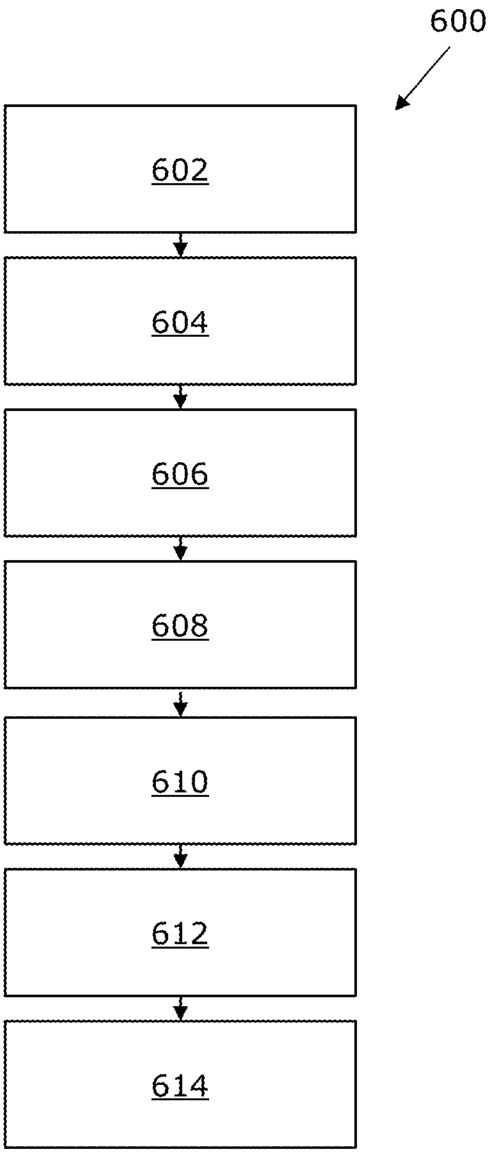
FIG. 6 is an illustration of a flowchart listing steps involved in a method for optimizing performance of an indoor industrial network, in accordance with an embodiment of the present disclosure.

Referring to FIG. 6, illustrated is a flowchart listing steps involved in a method 600 for optimizing performance of an indoor industrial network, in accordance with an embodiment of the present disclosure. At step 602, the method 600 includes receiving in an AI module at a network side of a TSN bridge from a sync agent of a mobile router at a device side of the TSN bridge of the indoor industrial network a Signal to Interference and Noise Ratio (SINR) and a Delay information. At step 604, the method 600 includes receiving from one or more first sensors one or more first parameters of the indoor industrial network. At step 606, the method 600 includes receiving from one or more cameras an obstacle data. At step 608, the method 600 includes determining deteriorating time accuracy of clocks in the one or more mobile devices based on at least one of the received SINR, one or more first parameters and obstacle data. At step 610, the method 600 includes providing the determined information of the deteriorating time accuracy to a central network controller (CNC) and a central user configuration (CUC) of TSN controllers of the indoor industrial network. At step 612, the method 600 includes instructing the CNC and the CUC to adjust a size of a data packet to be sent between mobile and one or more fixed devices. At step 614, the method 600 includes instructing a User Plane Function (UPF) sync agent to send a time information to the one or more mobile devices to re-calculate the time information and adjust the clocks.

Figure 7:
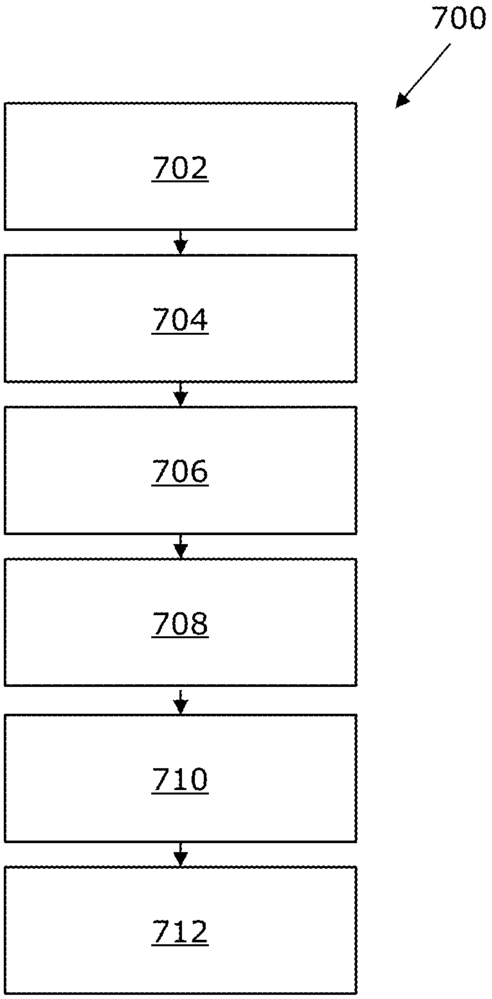
FIG. 7 is an illustration of a flowchart listing steps involved in a method for predicting network problems in an indoor industrial network, in accordance with an embodiment of the present disclosure.

Referring to FIG. 7, illustrated is a flowchart listing steps involved in a method 700 for predicting network problems in an indoor industrial network, in accordance with an embodiment of the present disclosure. At step 702, the method 700 includes collecting network data comprising at least one of a network performance data, a sensor data, and a device data. At step 704, the method 700 includes training an AI model on the collected network data. At step 706, the method 700 includes deploying the trained model in a TSN bridge. At step 708, the method 700 includes receiving real-time data from the network elements and sensors. At step 710, the method 700 includes using the trained model to predict network problems. At step 712, the method 700 includes adjusting the time information sent to the mobile devices to improve synchronization, and evaluating the performance of the model.

The invention claimed is:

1. A computer-implemented method for optimizing performance of an indoor industrial network, the method comprises receiving in an Artificial Intelligence (AI) module at a network side of a Time-Sensitive Networking (TSN) bridge from a sync agent of a mobile router at a device side of the TSN bridge of the indoor industrial network a Signal to Interference and Noise Ratio (SINR) and a Delay information;

receiving from one or more first sensors one or more first parameters of the indoor industrial network;

receiving from one or more cameras an obstacle data;

determining deteriorating time accuracy of clocks in one or more mobile devices of the indoor industrial network based on at least one of the received SINR, one or more first parameters and obstacle data;

providing the determined information of the deteriorating time accuracy to a Central Network Controller (CNC) and a Central User Configuration (CUC) of TSN controllers of the indoor industrial network;

instructing the CNC and the CUC to adjust a size of a data packet to be sent between the one or more mobile devices and one or more fixed devices;

instructing a User Plane Function (UPF) sync agent to send a time information to the one or more mobile devices to re-calculate the time information and adjust the clocks.

2. The method according to claim 1, wherein the method further comprises measuring one or more second parameters of an environment comprising temperature and humidity of the indoor industrial network by one or more second sensors.

3. The method according to claim 1, wherein the method comprises configuring the CNC to set the TSN frames transmission schedule and preferences and configuring the CUC to set the TSN frames transmission schedule in end devices.

4. The method according to claim 1, wherein adjusting comprises reducing the size of data packet if the synchronization is not accurate or maximizing the size of data packet if the synchronization is accurate.

5. The method according to claim 1, wherein the method comprises receiving a reference time from the one or more mobile devices having a GPS access for calculating a distance between the one or more mobile devices having the GPS access and the one or more fixed devices.

6. The method according to claim 1, wherein the method comprises receiving in a de-jitter module a highest residence time from the AI module.

7. A Time-Sensitive Networking (TSN) bridge for optimizing performance of an indoor industrial network comprising at a device side a sync agent of a mobile router and comprising at a network side an Artificial Intelligence (AI) module, wherein the AI module is configured to use machine learning algorithms to:

receive a Signal to Interference and Noise Ratio (SINR) and a Delay information from a sync agent of a mobile router at the device side of a TSN bridge;

receive and process parameters of the indoor industrial network, and obstacle data from one or more cameras;

determine deteriorating time accuracy of the clocks in one or more mobile devices of the indoor industrial network; and communicate with a Central Network Controller (CNC) and a Central User Configuration (CUC) of TSN controllers of the indoor industrial network.

8. An indoor industrial network comprising a Time-Sensitive Networking (TSN) bridge and an Artificial Intelligence (AI) module integrated into the TSN bridge, wherein the AI module is configured to optimize the performance of the indoor industrial network by using machine learning algorithms to analyze data from a sync agent of the mobile router, sensors, and cameras, and to discover and report on extra processing delays in the network, Uplink (UP) and Downlink (DL) delays for asymmetric communications, Signal to Interference and Noise Ratio (SINR) and obstacles that block signal and increase delay, predict potential problems in the network, take proactive measures to address them and interact with other network elements such as the User Plane function (UPF) sync agent, Central User Configuration (CUC) and Central Network Controller (CNC) to optimize the performance of time-sensitive applications.

9. A computer-implemented method for predicting network problems in an indoor industrial network for optimizing performance of the indoor industrial network comprising collecting network data comprising at least one of a network performance data, a sensor data, and a device data;

training an Artificial Intelligence (AI) model on the collected network data;

deploying the trained AI model in a Time-Sensitive Networking (TSN) bridge;

receiving real-time data from the network elements and sensors;

using the trained AI model to predict network problems;

adjusting the time information sent to one or more mobile devices of the indoor industrial network to improve synchronization, and evaluating the performance of the trained AI model.

10. A non-transitory computer readable medium on which is stored a computer program for optimizing performance of an indoor industrial network comprising instructions, which when executed by a computer, cause the computer to perform the method according to claim 1.

* * * * *